Nov. 1, 1966 E. JACOBS 3,282,268

INDEX DEVICE

Filed March 29, 1965 4 Sheets-Sheet 1

Nov. 1, 1966

E. JACOBS 3,282,268

INDEX DEVICE

Filed March 29, 1965

4 Sheets-Sheet 2

Nov. 1, 1966 E. JACOBS 3,282,268

INDEX DEVICE

Filed March 29, 1965 4 Sheets-Sheet 3

United States Patent Office 3,282,268

Patented Nov. 1, 1966

3,282,268

INDEX DEVICE

Egon Jacobs, 13 Rue Aldringer, Luxembourg, Luxembourg

Filed Mar. 29, 1965, Ser. No. 433,120
7 Claims. (Cl. 129—15)

The invention relates to a searching arrangement for reference books and particularly to an arrangement which permits a rapid and well-ordered searching of hand written or printed material such as name index registers, telephone books, dictionaries, lexicons, encyclopedias, technical books and the like.

The searching arrangement according to the invention provides also new possibilities and considerable advantages in setting up files and similar reference devices or arrangements.

The searching arrangements employed hitherto in connection with reference works make use of the alphabet as a definite sequence of letters impressed upon the mind by education. The fact that the alphabet has been put together at random in a sequenece of letters passed on through the generations, and in which the vowels and consonants are intermixed, results in the fact that none of the conventional reference works have rational searching arrangements. Furthermore, a searching arrangement which is based on the alphabetical sequence or order practically excludes the possibility of providing a rapid third dimension searching arrangement.

By third dimension searching arrangement is understood here the immediate advance to the third letter of a word, symbol or other reference to be located. This direct penetration to the third letter reduces the actual search range to the 17,567th part of the total reference material so as to limit the actual search to a small group of words or references which, depending on the scope of the total material, may vary from a few to perhaps a dozen such words.

With searching arrangements which use the alphabetical sequence it is necessary to check, after having located the initial letter of a word, also the entire alphabetical order in looking for the second letter of the word. Thereafter one repeats the same search for the subsequent letters until finally the particular word has been found. As may be readily seen, the systematic course of the alphabetical order presents a tedious process which brings about the desired result only after a relatively long period of time.

A searching arrangement which is based on the alphabetical order is therefore particularly disadvantageous in that it forces the person looking for a word also to consider for the second and third letter of a word a series of successive combinations whose occurrence may be determined as extremely rare or even non-existent.

The searching arrangement of this invention provides a considerable improvement with respect to the previously described disadvantages of the known searching arrangements and permits a rapid, rational and simple searching of a desired word or object.

The new arrangement is based on the recognition of the fact that in the existing words or in the formation of new words the phonetics of the languages permit only certain sequence combinations of the different letters of the alphabet. Thus, it may be assumed as a general rule that after a vowel usually a consonant and after a consonant usually a vowel follows, but that preferably certain vowels follow the consonants and certain consonants the vowels. In the less frequent occurrences where a vowel follows a vowel or a consonant follows a consonant, it is also true that only certain suitable vowels follow previous vowels and only suitable consonants follow previous consonants. As illustration for this one may cite, for example, that after the initial letter "e" almost never another "e" follows and after the initial letter "i" never another "i" or "y" follows, and that after the initial letter "b" never another "b," "c," "d," "f," "g," "h," "j," "k," "m," "n," "p," "q," "t," "v" or "w" follow, but often a "l" or "r." As stated, it is particularly true when these letters are the first letters of a word, but this is otherwise also generally true.

The new searching arrangement thus takes advantage of the fact that for the formation of a word the majority of the possible sequence combinations which, according to the letters of the alphabet, would theoretically be possible, actually do not occur. This situation provides the possibility of shortening the time and effort in looking for a word by extending the material or substance among the frequently occurring sequence combinations, and by reducing the excluded sequence combinations under a collective symbol. As a result the following new arrangement is obtained.

(1) For the frequently occurring sequence combinations the vowels and consonants are divided into two groups of which one group comprises all the vowels of the alphabet, thus A, E, I, O, U, Y and the second group comprises all of the consonants comprised in the alphabet, thus B, C, D, F, G, H, J, K, L, M, N, P, Q, R, S, T, V, W, X, Z.

(2) For the sequence combinations which occur less frequently the vowels are grouped under the collective symbol "+" and the consonants under the collective symbol "—."

The new combination of the letters, except for the new arrangement or subdivision, follows the conventional alphabetical order, and a systematic re-arrangement of this order would not be reasonable or practical, and is not recommended.

Accordingly the new searching arrangement could be called in view of its structure, a vowel-consonant alternating arrangement.

One of the primary features of the invention resides in the possibility of building up a third dimension searching device which permits an immediate advance to the third letter of a word to be located. This advantageous expansion which was not possible in a system based on the alphabetical order due to the large combination of empty spaces for non-occurring sequence combinations is now realized by eliminating these sequence combinations by means of the new arrangement according to the invention. The new searching device allows the editor to extend the search material or to reduce it so that the reference device is set up in a substantially uniform manner.

The invention thus provides a three dimensional searching arrangement for reference works employing a nonalphabetical sequence of letters and of symbols comprising a visual guidance arrangement of the letters and symbols, a division of the vowels and consonants into two groups, one of said groups including all the vowels of the alphabet and the other of said groups including all the consonants of the alphabet, the letters of sequence combinations of both groups occurring with greater frequency being increased in establishing the searching arrangement.

An advantage of the new searching system resides in the fact that it permits the combination and issue of an extensive reference material in handy book form or in the form of a limited number of classification units.

It is another advantage of the new searching arrangement that a continuous supplementing of reference material to the existing state of the art is continuously possible.

It is a further advantage of the new searching arrangement that it is suitable for searching abbreviated words or a combination of initials.

These and other features and advantage of the novel searching arrangement provide that this arrangement is particularly suitable for setting up files, which may consist among others of lists of pharmaceutical specialities, postal guide numbers, insurance numbers in life or sickness insurances, membership lists and the like.

The invention will be described in greater detail hereafter by means of examples in combination with the accompanying drawings in which.

The new reference device according to the invention will basically comprise in principle the following:

(1) The reference arrangement which has no direct connection with the search material but which will be adapted to each particular search material in relation to the scope and composition.

(2) The note books which may be in the form of small exchangeable copy books and which contain the actual search material.

Figures 1, 2, 6:
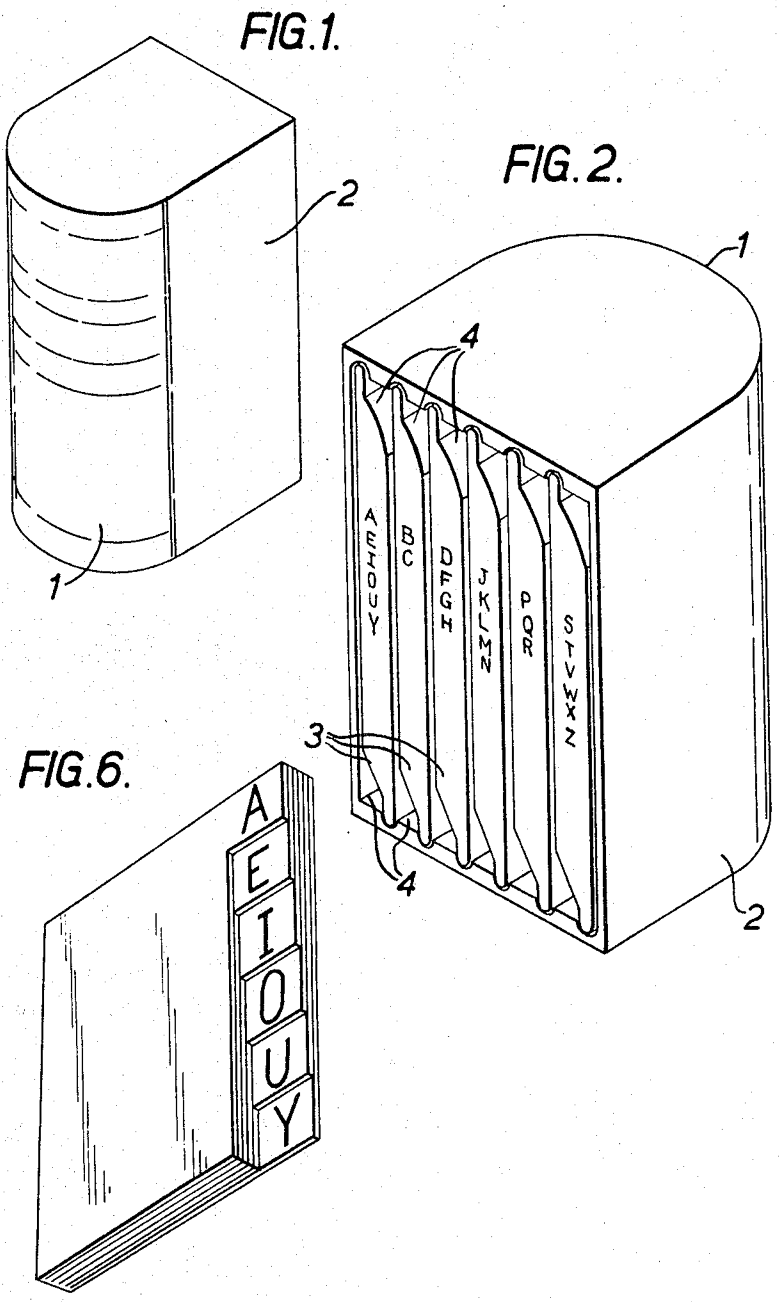
FIGURE 1 shows a perspective view of the back of a reference device according to the invention in the form of a book.
FIGURE 2 shows a perspective view of the front of the reference device according to FIGURE 1.
FIGURE 6 shows a perspective view of a note book which may be used with the reference tray according to FIGURES 2 and 3.

In FIGURE 1 the basic concept is expressed by showing that the new reference device may be used in a library like other books of the conventional form. The outer conventional book form is thus retained here. In FIGURE 1 the back of the book is identified by numeral 1 and numeral 2 identifies the rigid casing which receives the reference trays 3 to be described hereafter in regard to FIGURE 3. The back and casing may be bound in leather or cloth, or may have any other suitable covering. The casing 2 must be strong so that it permits an easy sliding of the tray 3 in and out the casing. The casing is further subdivided into several boxes or stalls each of which receives one reference tray. It is appropriate to make the rigid frame for the casing and the boxes of a suitable plastic material which is hard and resilient. A plastic material is preferable in view of its small weight and relatively high strength. The individual boxes may be separated by thin walls made of the same material as the main casing and produced integrally therewith. Furthermore the boxes may be closed by hinged plastic covers.

The rigid casing will be called hereafter the "book casing" into which the "reference trays" are received. The reference trays are disposed perpendicularly adjacent each other in the book casing (see FIGURE 2). They are held in place at the rear wall of the book casing by a snap catch which may be either a magnetic or a clamping catch. They may also be retained by linkage means fixed to the top of the casing and pivotable outwardly.

Figure 3:
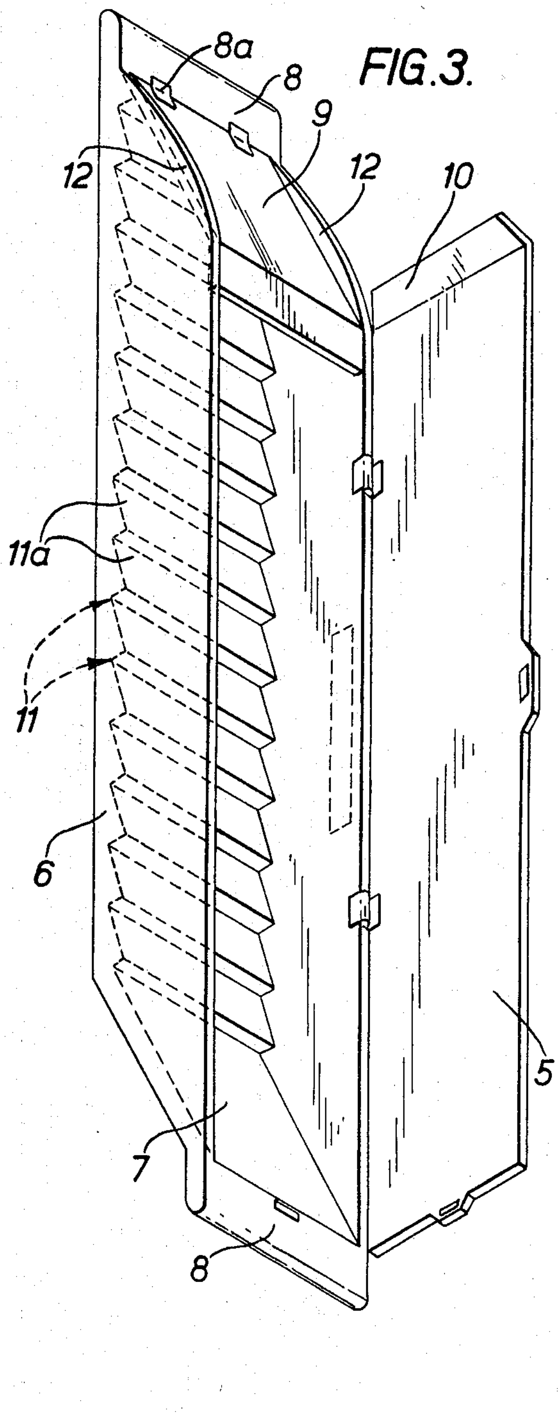
FIGURE 3 shows a perspective view of a reference tray which may be used in connection with the device illustrated in FIGURE 2.

The reference trays are illustrated in FIGURE 3 and consist of rigid plastic material like the book casing. They consist of an elongate flat tray or box which is closed by a cover 5 which may be completely pivoted back and which is held in place by a suitable catch when it is in the closed position. At one of its ends the floor 6 of the tray ascends in a slope 7 up to the level of the cover in the closed position. At both ends the tray terminates in a strong plastic ledge 8. Hinges 8a are provided in the ledge which is at the same plane as the tray floor 6. The hinges support pivotally a cover 9 of rigid plastic material. The cover 9 will be disposed after filling of the tray in its rest position substantially parallel to the inclined slope 7. It will be retained in this position during the upright positioning of the tray in the book casing by a suitably rounded and forwardly bent flange 10 at the casing cover by closing the cover 5. The floor of the tray is suitably grooved in a uniform manner substantially in a saw-tooth-like manner. This grooving 11 extends from the one ledge of the tray carrying the hinges to the inclined floor slope 7. The two outer walls 12 of the tray project somewhat beyond the cover 9. They are slightly rounded here and are reinforced outwardly by a slight thickening or by means of a metal coating.

Figure 4:
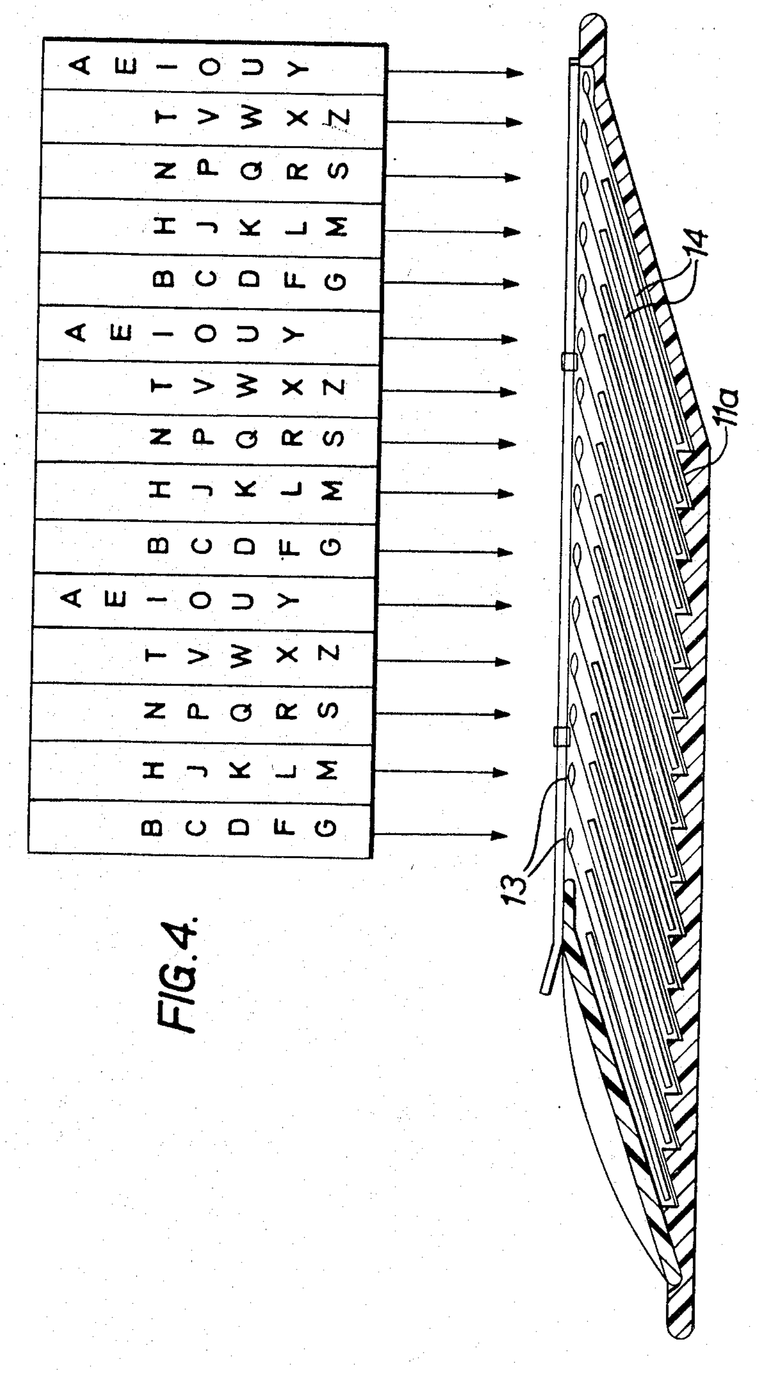
FIGURE 4 shows a side view of the tray of FIGURE 3.

Seen in side view, the reference tray has a sloping part at both ends. As may be seen from FIGURE 2, this provides between two adjacent trays the intermediate spaces 4 which permit an easy engripping and withdrawing of the trays. Plastic sheets 13 of the same size are glued or otherwise secured to the inclined sides 11a of the grooves in the floor of the tray, as seen in FIGURE 4. Due to this arrangement the plastic sheets 13 will be stacked so that each sheet is partially superimposed on the next sheet. The last sheet rests on the slope 7 of the tray floor. Between the plastic sheets 13 note books 14 are inserted as will be described more fully hereafter.

Figure 5:
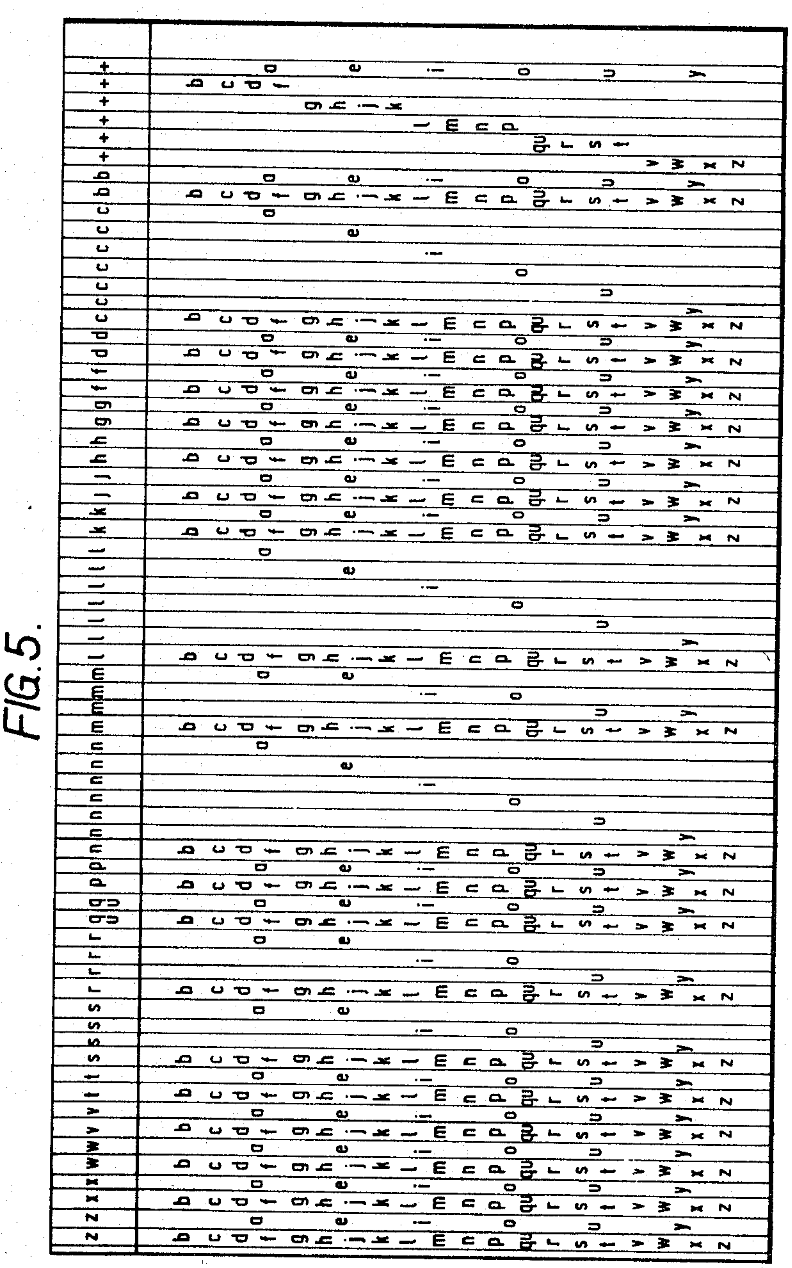
FIGURE 5 shows the distribution of the searching arrangement for a predetermined reference tray.

When the cover 5 is opened the arrangement of the plastic sheets 13 provides a strip-like succession of the different plastic sheets. The easily apparent, open, strip-like partial surface of each plastic sheet not overlapped by the preceeding sheets serves as letter printing surface. FIGURE 5 shows in diagrammatic representation a typical distribution of the letters of a searching arrangement as placed upon the different open strips of the plastic sheets of a particular tray.

This overlapping system of the sheets leaving small surface strips uncovered as places for applying reference indications about the contents of the search material located on the sheets is not new. This arrangement exists for some time already in the form of slide trays which may be used to classify and locate correspondence or information and the like. The letters or words are written at the upper edge of separation walls in the form of small paper strips which carry the letters and are slipped under corresponding transparent plastic sleeves. Similar paper strips may therefore be also used for the classification or searching arrangement according to this invention. The cover leaves 13 of the present arrangement may be preferably provided with a small thickened portion in the form of a bead extending from the surface inwardly to leave a space between the sheets so that they may be more easily located with the finger or allowing inserting the nail thereunder in order to lift a particular sheet. Furthermore each cover sheet is provided at the left edge with a brightly colored edge strip of about 1–2 cm. The color of this strip may be, for example, light yellow. The remaining portion of the cover sheet is preferably of a white color. These colors serve as a light background for the printed letters which are of a dark color. In this connection it is advisable to have a different color for the vowels and the consonants. The vowels can be, for example, of a dark red or dark green color, while the consonants can be of a dark blue or black color. The small light-colored strip of the left edge of each cover sheet serves as base for the printing or writing of the second letter of the searching arrangement, as may be seen from FIGURE 5. The white remaining portion of the cover sheet provides the base for printing or writing the third letter of the searching arrangement. The initial letters of the words are placed on the tray in such a manner that they are easily visible when the tray is in position in the book casing (see FIGURE 2).

In FIGURE 5 one of the reference trays is illustrated. This is the tray of the vowels A, E, I, O, U, Y which will be described now in greater detail. From this figure may be seen very easily how this vowel-consonant alternating system may be employed. In the vowel tray A, E, I, O, U, Y one obtains for the second letter which are printed on the small colored strip, for the vowel sheets which constitute preferably the first cover sheets, only six vowel cover sheets which comprise under the red "+" collective symbol all the vowels, while there are 61 cover sheets for the consonants. This means that the 20 consonants cover due to their frequency each at least two cover sheets, some even six cover sheets. As a sharp separation is maintained also between the vowels and consonants of the third letter it is essential for a continuation of the search to the third letter, that in each instance two cover sheets are used, whether by only one consonant or by one of the collective symbols for several consonants or vowels which do not have their own cover sheets. This duality of at least two cover sheets for each second letter as minimum amount is derived as a natural consequence from the continuation of the search with the third letter, on the one hand with consonants, on the other hand with vowels, so that the starting point of second letters must necessarily be a double track.

The third letters which are printed on the right, wide portion of the cover sheets show also, due to the differentially large participation of vowels and consonants, different subdivisions. In the case of the third letter the collective symbols "+" and "—" were no longer used in order to provide a better overall view.

In connection with the consonant tray BC one would notice that in contrast to the above described vowel tray, 48 cover sheets are used by the vowels for the second letter while only 14 are used for certain consonants, i.e. for "l" and "r." The remaining part of the consonants would be combined under the collective symbol "—" on two cover sheets. A similar situation exists also in other consonant trays.

It will be appreciated that the tray illustrated in FIGURE 5 is not intended to limit the invention to this particular structure, but it is clear that the tray and the searching arrangement are to be adapted to each specific searching material. An exact investigation of the searching material is therefore recommended before such a searching system is prepared in order that a uniform distribution can be obtained.

The manner of searching or locating a particular word with the novel searching arrangement this invention will now be described in greater detail. In finding a particular word the following steps are required:

(1) The reference tray corresponding to the first letter of the word is selected.

(2) One moves longitudinally along the tray to the second letter (vowel, consonant or collective symbol) of the particular word.

(3) One moves transversely of the tray or downwardly to the third letter of the word whereby the specific cover sheet is located under which the word sought may be located, usually among 1 to 12 words.

(4) One opens the cover sheet and finds the note book which bears also all the initial letters of its particular tray, and the note book is open at the place which corresponds to the initial letter of the word sought and one finds this word.

The search for particular words proceeds much faster than the reading of these four steps. It has been stated in the introductory portion that the invention reduces the searching material theoretically to the 17,576 part of the entire material. This number is derived by the multiplication of the number of letters in the alphabet, thus $26\times26\times26$: In this respect the non-occurring sequence combinations were considered. It is obvious that their number is extremely large. But one can also say that the extending of the searching material under specific frequently occurring sequence combination such as S-T and S-P is very large. Therefore the distribution which is to be prepared by the editor or manufacturer is very important in the new searching arrangement. However, a uniform distribution is possible for any material.

One of the above mentioned note books is illustrated in FIGURE 6. Each note book has at its right opening side the already known indentations which make the lower letters visible on uniformly distributed surfaces. The number of surfaces corresponds to the number of initial letters on the particular reference tray. The first letters of the tray are printed on these surfaces. The second and third letters may also be printed already on these surfaces as far as they are predetermined, but here the second and third letters do not play an important role because the steps for locating the word have already been taken by this time. The particular words are written or printed on the inside of the note book. They may be written by hand or may be inserted as complete finished printed sets.

If each reference tray would have only one first letter a new sub-division would be unnecessary. In that case 26 trays would be necessary. This might appear appropriate for a few vowels and a few consonants but certainly not for the letters q, x, y and z. The subdivision is thus practically necessary. It does not present any particular difficulties except that the searcher must also open the note book after having opened the cover sheet and at the place which corresponds to the first letter of the word to be located there.

It is recommended not to provide the note book with a cover as it is unnecessary and it would only make the cover sheets bulkier as well as somewhat extend the search because it would also have to be lifted up before opening the note book at the right letter. Each copy book should be made of thin, but strong paper sheets. The note books can also carry the firm name or trademark of the editor or manufacturer in appropriate shape and size.

Although the invention has been described by way of an embodiment it is clear that other examples and modifications may be employed. Thus, one could use instead of the suggested book form a cabinet with drawers which would serve as reference trays.

What is claimed is:

1. A three-dimensional searching device comprising:
(a) a reference tray,
(b) a first index on an exposed face of said tray,
(c) said tray being provided with a plurality of sheets arranged in a stepped order, each of said sheets provided with a face portion for the receipt of index indicia, a first small portion of said face portion having a second index thereon, a second larger portion of said face portion further having a third index thereon,
(d) and not books positioned between successive ones of said sheets, said note books having a fourth index thereon corresponding to said first index on the face of said tray, wherein said first index corresponds to a first letter of a word to be searched, said second index corresponds to a second letter, said third index corresponds to a third letter and said fourth index again corresponds to said first letter.

2. A three-dimensional searching device according to claim 1 including a casing and a plurality of said trays positioned within said casing.

3. A three-dimensional searching device according to claim 1 wherein said tray includes a floor portion having sawtooth-like grooves thereon, and said successive sheets and note books being positioner in successive grooves.

4. A three-dimensional searching device according to claim 1 wherein said tray includes a floor portion having an inclined slope at one end thereof.

5. A three-dimensional searching device according to claim 1 wherein said tray has a ledge at each end thereof, said ledges being laterally offset from each other.

6. A three-dimensional searching device according to claim 1 wherein said tray includes a floor portion having an inclined slope at one end thereof, a pair of side portions secured to said floor portion, a cover attached to said said floor portion at the other end thereof and substantially parallel to said inclined slope; and a door cooperating with said side portions, said cover and the terminus of said inclined slope to close said tray.

7. A three-dimensional searching device as defined in claim 1 wherein said set of indicia on said note book are arranged and on notched portions of pages in said note book.

References Cited by the Examiner

UNITED STATES PATENTS

| | | | |
|---|---|---|---|
| 1,119,925 | 12/1914 | Chatham | 129—16 |
| 1,463,733 | 7/1923 | Turner | 129—15 |

FOREIGN PATENTS

| | | |
|---|---|---|
| 13,737/33 | 3/1934 | Australia. |
| 807,624 | 7/1951 | Germany. |

LAWRENCE CHARLES, *Primary Examiner.*